United States Patent [19]

Winberg

[11] 4,128,162
[45] Dec. 5, 1978

[54] VIBRATORY OUTFEED

[75] Inventor: Paul N. Winberg, Fayetteville, N.Y.

[73] Assignee: Lipe Rollway Corporation, Syracuse, N.Y.

[21] Appl. No.: 820,368

[22] Filed: Jul. 29, 1977

[51] Int. Cl.² .............................................. B65G 27/00
[52] U.S. Cl. .................................... 198/763; 198/860;
248/14; 248/204; 248/205 R; 248/220.1; 248/346
[58] Field of Search .................. 198/752, 755, 759, 763,
198/771, 860; 248/14, 16, 204, 205 R, 220.1, 216.1, 216.4, 346, 350

[56] References Cited

U.S. PATENT DOCUMENTS

| | | | |
|---|---|---|---|
| 2,157,339 | 5/1939 | Jeffery et al. | 198/771 |
| 2,446,752 | 8/1948 | Fiddyment | 198/759 |
| 2,779,010 | 1/1957 | Pifer | 248/14 |
| 2,925,740 | 2/1960 | Chung | 248/16 |
| 3,191,894 | 6/1965 | Kagley | 198/763 |
| 3,789,711 | 2/1974 | Mead | 198/752 |
| 3,964,601 | 6/1976 | Armstrong | 198/755 |

*Primary Examiner*—Joseph E. Valenza
*Attorney, Agent, or Firm*—Stonebraker, Shepard & Stephens

[57] ABSTRACT

A vibratory outfeed conveyor has a base, a feed strip resiliently mounted on the base, and a vibrator connected to the feed strip for feeding objects. A mounting bracket extends downward generally perpendicularly from the base, and an upper region of the mounting bracket is secured to a vertical surface of a support element so that the base extends horizontally over the upper surface of the support element. Spacers support the base above the upper surface of the support element so that a midregion of the base between the spacers is bendable downward. Screws engage the vertical surface and the lower region of the mounting bracket for moving the lower region of the mounting bracket away from the vertical surface while the upper region of the mounting bracket is secured to the vertical surface to apply leverage force to the base bending the midregion of the base toward the upper surface and pressing the free end of the base downward to hold the free end securely in place. Such an arrangement securely fixes the base in place without requiring fasteners or hold-down means arranged at the free end of the base.

12 Claims, 5 Drawing Figures

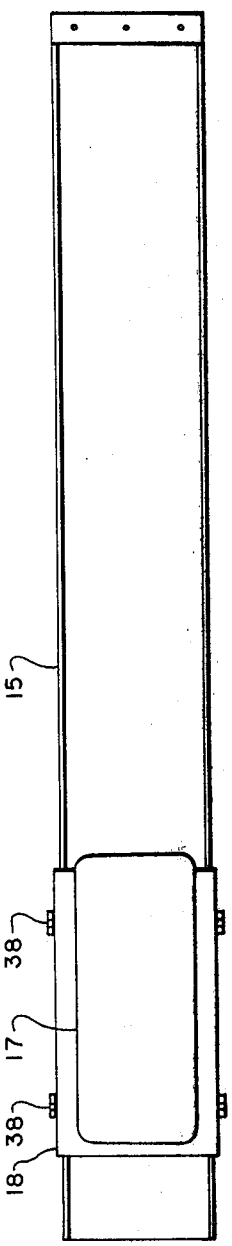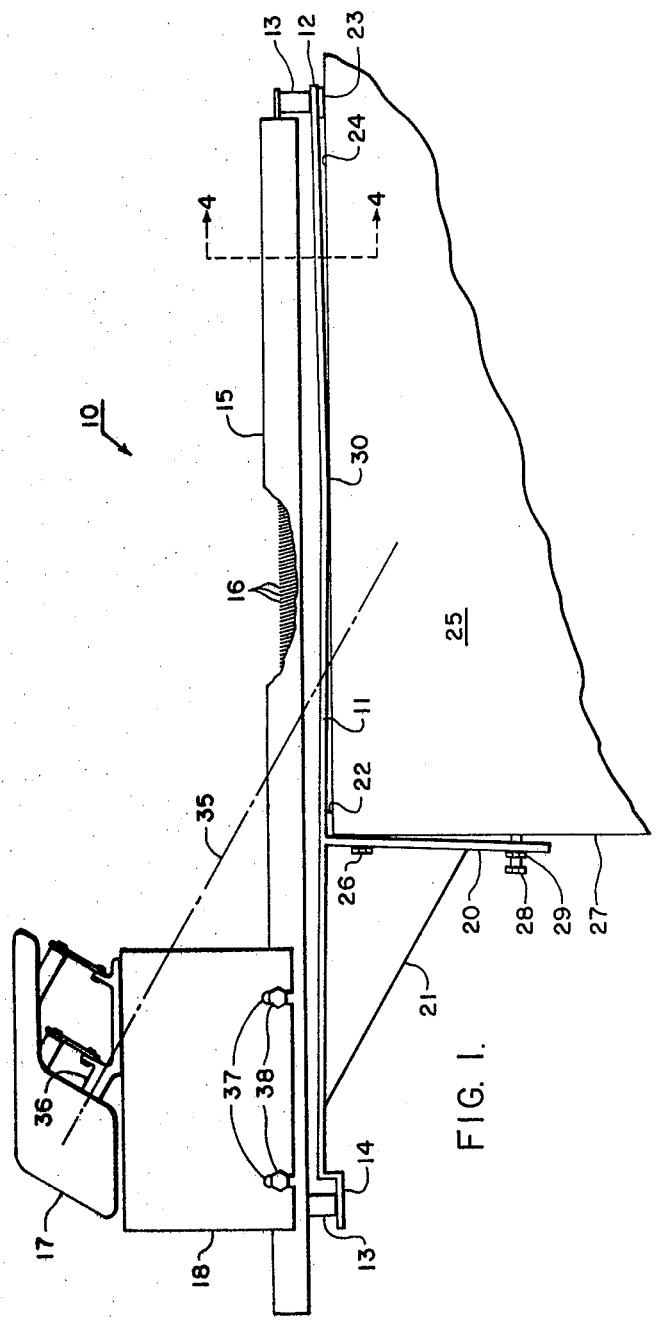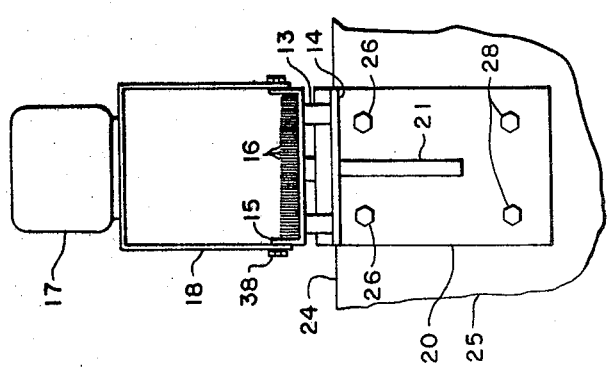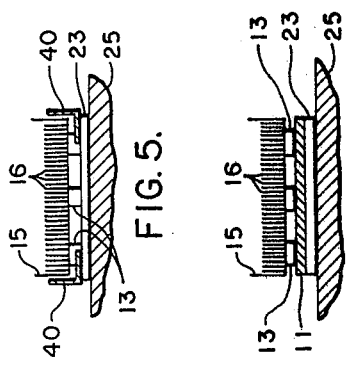

VIBRATORY OUTFEED

BACKGROUND OF THE INVENTION

Outfeed conveyors for punch presses and other machines are useful in conveying parts away from a work station, provided they can be fitted into narrow and confining spaces and can operate in harsh environments. Such a conveyor is suggested in U.S. Pat. No. 3,789,711 for punch presses, and this invention is an improvement on such conveyors. The invention aims at more convenient and reliable mounting or securing of an outfeed conveyor in place, a low profile or overall height so that such a conveyor can work within a small vertical space, and general simplicity and reliability in arranging and mounting an outfeed conveyor.

One of the problems of prior art outfeed conveyors is the need for fastening or holding the free end of the conveyor in place in a location where fastening devices are very difficult to install because of a confined working space. Another problem with prior art outfeed conveyors is difficulty in achieving a good vibrational motion for fast and reliable feeding of objects while limiting the conveyor to a low maximum height. Both of these problems are solved according to the invention with a conveyor mounting system that does not require fastening or holding devices at the free end of the conveyor and with a structure that minimizes the overall height and still provides effective and reliable vibrational motion.

SUMMARY OF THE INVENTION

The inventive vibratory outfeed conveyor has a base, resilient means for mounting a feed strip on a base, and a vibrator connected to the feed strip for vibrating the feed strip to outfeed objects. A mounting bracket that is generally perpendicular to the base extends downward from the base, and the upper region of the mounting bracket is secured to a vertical surface of a support element so that the base extends horizontally over an upper surface of the support element. A free end of the base is supported above the upper surface of the support element so that a midregion of the base between the mounting bracket and the free end is bendable downward toward the upper surface of the support element. Screw means engage the vertical surface of the support element and a lower region of the mounting bracket for moving the lower region of the mounting bracket away from the vertical surface while the upper region is secured to the vertical surface to apply leverage force to the base to bend the midregion of the base toward the upper surface and to press the free end of the base downward to hold the free end securely in place relative to the upper surface.

DRAWINGS

FIG. 1 is a partially cut-away and partially schematic side elevational view of a preferred embodiment of the inventive conveyor as mounted on a support element;

FIG. 2 is a partially schematic end elevational view of the conveyor of FIG. 1;

FIG. 3 is a partially schematic plan view of the conveyor of FIG. 1;

FIG. 4 is a cross-sectional view of the conveyor of FIG. 1 taken along the line 4—4 thereof; and FIG. 5 is a cross-sectional view similar to the view of FIG. 4 and showing an alternative preferred embodiment of the inventive conveyor.

DETAILED DESCRIPTION

Conveyor 10 as shown in FIGS. 1-4 includes a base 11, preferably formed as a flat steel strip extending for the length of conveyor 10. The input to conveyor 10 is over the free end 12 of base 11, and resilient elements 13 are arranged at the input or free end 12 of base 10 and at the output end 14 of base 10 for resiliently supporting a feed strip 15 for vibrational motion. Feedstrip 15 is preferably channel shaped as illustrated with either an H shape or channel shape in cross section and has its upper or feed surface covered with an array of resilient elements 16 that are uniformly inclined from the vertical toward the feed direction and are molded or formed of a fiber-like material for resiliently supporting and moving objects along on the tips of elements 16. Resilient support elements 13 allow feedstrip 15 to be vibrated relative to rigid base 11, and this is accomplished by vibrator 17 mounted on bracket 18.

One of the problems of prior art outfeed conveyors is fastening them securely in place in confined spaces. This is particularly true for outfeed conveyors for punch presses where the conveyor must be fastened to the bolster plate under the die where there is little overhead clearance and working space is very confined. Conveyor 10 has a simple and effective mounting arrangement according to the invention that solves this problem, and only two tapped holes are required to be made in a freely accessible place for mounting conveyor 10 in place.

Mounting bracket 20 is generally perpendicular to base 11 and extends downward as illustrated. Base 11 extends outward toward the output end of the conveyor from bracket 20, and a brace 21 extends between bracket 20 and the outward extension of base 11 for bracing bracket 20 securely relative to base 11. A pair of spacer strips 22 and 23 are arranged under base 11 in the region of mounting bracket 20 and in the region of free end 12 of base 11 as illustrated. This allows a midregion of base 11 between spacer strips 22 and 23 to be bendable downward toward upper surface 24 of support element 25. For a punch press, support element 25 is the bolster plate of the press, but in applying conveyor 10 to other machines, support element 25 can have other functions and configurations.

A pair of screws 26 or other fasteners or clamps secure the upper region of support bracket 20 rigidly to vertical surface 27 of support element 25, and screws 26 are securely anchored in a pair of tapped holes made in support element 25. Another pair of screws 28 are threaded through a lower region of support bracket 20 and through lock nuts 29 to engage vertical wall 27 of support element 25. Screws 28 are threaded through the lower region of support bracket 20 far enough to space it slightly away from vertical surface 27 as shown in exaggerated form in FIG. 1, and then screws 26 are tightened to draw the upper region of support bracket 20 tightly against vertical surface 27 of support element 25. This applies leverage force to base 11 that bends the midregion of base 11 downward toward upper surface 24 of support element 25, and also applies downward force on the free end 12 of base 11 against spacer strip 23 to force free end 12 tightly downward against support element 25. This firmly anchors conveyor 10 in place without requiring special fasteners in the region of free end 12. The leverage force applied to bend and press base 11 downward is preferably sufficient so that midregion 30 of base 11 is spaced just slightly above upper surface 24. Although spacer strip 22 is convenient for installation of conveyor 10, it is not required after screws 26 fix mounting bracket 20 in place. Also, spacers may not be necessary if upper surface 24 is not flat or is configured to allow downward bending of base 11. Screws 28 are preferably adjusted to achieve the desired leverage force and are then held in place by lock nuts 29, and screws 26 are preferably loosened to allow adjustment of screws 28.

The preferred vibrational mode for feedstrip 15 is a generally reciprocal movement inclined above the horizontal and generally aligned with the direction of feedstrip 15. To conserve in overall height, resilient support elements 13 are preferably arranged at opposite ends of feedstrip 15 so that support elements do not have to be interposed in the narrow space between feedstrip 15 and base 11. In the illustrated embodiment, resilient elements 13 are non-directional, and vibrator 17 applies the preferred vibrational mode to feedstrip 15. The mounting of vibrator 17 on top of bracket 18 helps with this, because a line of vibrational force 35 passing through the driver of vibrator 17 is inclined downward at an appropriate angle from the upper region of bracket 18 so as to approximately intersect the center of mass of feedstrip 15 and thus insure uniform vibration throughout the length of feedstrip 15. Bracket 18 is preferably adjustably supported by bolts 38 in slots 37 for setting vibrator 17 at the proper height and angle to achieve this. Aiming or directing the vibrational line of force from vibrator 17 approximately through the center of mass of the passive load provided by feedstrip 15 and bracket 18 insures uniform vibration throughout the length of feedstrip 15 so that objects move uniformly and forcefully along the full length of feedstrip 15.

FIG. 5 shows an alternative structure for the base for conveyor 10 as formed of a pair of angle irons 40 arranged as illustrated along opposite side edges of feedstrip 15, rather than a flat steel plate 11. Angle irons 40 occupy a relatively thin region under feedstrip 15 compared to the relatively thicker plate 11, and yet their longitudinal stress characteristics can be made comparable to those of base plate 11 by virtue of their angle-iron configuration. Spacer strip 23 can then be a strip that secures angle irons 40 together and also spaces them slightly above upper surface 24 of support element 25 to allow room for downward bending in response to the leverage force supplied by mounting bracket 20. Such an arrangement reduces the overall height of conveyor 10 by about one-quarter inch for those situations where low overall height is especially important. Another alternative that cooperates well with angle irons 40 is to form feedstrip 15 with an H-shaped cross section so that the upper or channel portion of the H shape does not extend above resilient element 16. Then the downwardly extending portions of the H shape can be configured to overlap with the vertical portions of angle irons 40 to provide a labyrinth-type seal against dirt and other foreign matter.

The same basic mounting arrangement using bracket 20 and a base spaced slightly over a support element can be used for mounting the inventive conveyor in several different ways, depending upon the machinery and support elements involved. Different resilient support elements can be interposed in various ways between a base and the vibratory feedstrip, and vibrators of several different types can be mounted in different ways to apply the desired vibrational force to feedstrip 15. Resilient elements 16 can also be formed in several different ways and applied to feedstrip 15 to improve the feed characteristics of the conveyor. Once the basic concepts of the invention are understood, workers skilled in the art will appreciate how to apply the invention to conveyors mounted and operated in different ways.

I claim:

1. A vibratory outfeed conveyor having a base, resilient means for mounting a feedstrip on said base, and a vibrator connected to said feedstrip for vibrating said feedstrip to outfeed objects, said conveyor comprising:
   a. a mounting bracket connected with and generally perpendicular to said base and extending downward from said base;
   b. means for securing an upper region of said mounting bracket to a vertical surface of a support element so that said base extends horizontally over an upper surface of said support element;
   c. a free end of said base being supported above said upper surface of said support element by spacer means so that a midregion of said base between said mounting bracket and said free end is bendable downward toward said upper surface; and
   d. screw means engaging said vertical surface and a lower region of said mounting bracket for moving said lower region of said mounting bracket away from said vertical surface while said upper region is secured to said vertical surface to apply leverage force to said base to bend said midregion of said base toward said upper surface and to press said free end of said base downward to hold said free end securely in place relative to said upper surface.

2. The conveyor of claim 1 wherein said base extends outward from said mounting bracket on the side of said mounting bracket opposite said free end, and a brace for said mounting bracket extends between said mounting bracket and said outward extent of said base.

3. The conveyor of claim 1 wherein said base is a flat sheet, said upper surface of said support element is generally flat, and said spacer means are spacer strips which are arranged for spacing said base above said upper surface in the region of said free end and in a region adjacent said mounting bracket.

4. The conveyor of claim 1 wherein said base is formed of a pair of angle irons arranged along opposite side edges of said feedstrip.

5. The conveyor of claim 4 including strips connecting said angle irons together and at least one of said strips serving as a spacer for spacing said free end of said angle irons slightly above said upper surface of said support element.

6. The conveyor of claim 1 wherein said vibrator is mounted on a bracket extending upward from said feedstrip.

7. The conveyor of claim 1 wherein said vibrator is arranged for vibrating said feedstrip in a generally reciprocal motion in a direction inclined between horizontal and vertical planes.

8. The conveyor of claim 7 wherein said vibrator is arranged so that a line of vibrational force produced by said vibrator approximately intersects the center of mass of said feedstrip.

9. The conveyor of claim 8 wherein said vibrator is mounted on a bracket extending upward from said feedstrip.

10. The conveyor of claim 9 wherein said resilient means for mounting said feedstrip on said base are non-directional.

11. The conveyor of claim 7 wherein said resilient means for mounting said feedstrip on said base are non-directional.

12. The conveyor of claim 7 wherein said feedstrip is covered with an array of resilient elements uniformly inclined from the vertical toward the direction of feed along said feedstrip for supporting and moving said objects along on the tips of said resilient elements.

* * * * *